United States Patent

Geyer et al.

[11] Patent Number: 5,725,183
[45] Date of Patent: Mar. 10, 1998

[54] MULTICONTACT SPACING CONTROL DEVICE

[75] Inventors: Freddy Geyer, Tanneron; Gérard Vezain, Mandelieu; Christian Roux, Grasse, all of France

[73] Assignee: Aerospatiale Societe Nationale Industrielle, France

[21] Appl. No.: 520,847

[22] Filed: Aug. 30, 1995

[30] Foreign Application Priority Data

Aug. 30, 1994 [FR] France ................... 94 10424

[51] Int. Cl.⁶ ............... B64D 1/12; B64G 1/64
[52] U.S. Cl. ............... 244/161; 244/158 R; 244/137.4
[58] Field of Search ............... 244/137.1, 137.4, 244/158 R, 161; 294/82.26, 82.29

[56] References Cited

U.S. PATENT DOCUMENTS

| 3,116,895 | 1/1964 | Mitchum, Jr. ............... 244/158 R |
| 3,196,745 | 7/1965 | Sustrich. |
| 4,067,308 | 1/1978 | Anderson et al. ............... 244/158 R X |
| 4,257,639 | 3/1981 | Stock ............... 244/137.4 X |
| 4,632,339 | 12/1986 | Yuan ............... 244/158 R |
| 5,060,888 | 10/1991 | Vezain et al. ............... 244/158 R |
| 5,115,708 | 5/1992 | Spariat et al. . |
| 5,129,601 | 7/1992 | Henkel ............... 244/158 R |
| 5,395,149 | 3/1995 | Herman et al. ............... 244/137.4 X |

FOREIGN PATENT DOCUMENTS

| 0454545 | 10/1991 | European Pat. Off. . |
| 0469939 | 2/1992 | European Pat. Off. . |
| 2654701 | 5/1991 | France . |

*Primary Examiner*—William Grant
*Attorney, Agent, or Firm*—Hayes, Soloway, Hennessey, Grossman & Hage, P.C.

[57] ABSTRACT

Two members, such as a spacecraft and an object to be ejected from said spacecraft, are normally maintained in contact by an unlockable connecting device. In order to bring about an optimum control of the attitude of the object during its ejection, the two members contact each other by at least two pairs of complementary cylindrical surfaces having generatrixes parallel to the ejection force and which simultaneously lost contact. The cylindrical surfaces can be formed on a mast connected to the spacecraft and in a bore connected to the object.

14 Claims, 3 Drawing Sheets

MULTICONTACT SPACING CONTROL DEVICE

BACKGROUND OF THE INVENTION

1. Field of the Invention

The present invention relates to a device designed for controlling the spacing of two members in contact with one another, and more particularly to a device that minimizes the disturbance of the attitude of these members at the time of their separation. A preferred application of such a device is in the launching and putting into position of objects such as satellites, probes, etc. from a transporting spacecraft such as a launcher, a planetary probe, etc.

2. Description of Related Art

During the ejection of an object three parameters must be controlled. They are the ejection direction, the ejection velocity and the attitude of the object.

The first parameter is conventionally controlled by means of the positioning of the axis of the spacing control device with respect to the spacecraft axis. The velocity is controlled by knowledge of the motor energies. Finally, the attitude of the object is generally controlled by rotating said object about its axis (i.e., imparting a spin).

However, the spin motion of the object is generally very inadequate for controlling its attitude. Thus, acceleration of the object during its ejection produces internal and/or external deformations on the spacing control device. These deformations are, in particular, due to action-reaction phenomena, internal shocks, etc. During the acceleration of the object, during which the object is in contact with the spacing control device, these deformations tend to produce a transverse velocity which rotates the object about its center of gravity.

This behavior disturbing the attitude of the ejected object is illustrated in FIG. 1. In FIG. 1, the reference 10 designates an object such as a satellite or probe. This object 10 is represented at the time where its contact with the spacecraft 12, which initially supported it, is interrupted.

In order to bring about an optimum control of the direction in which the object 10 is ejected and optionally produce a spin motion of said object during ejection, the spacecraft 12 carries a mast 14 normally integrated into a spacing control device (not shown). This mast 14 guides the object 10 during its ejection. The mast 14 is fitted into a bore 16 having a complementary cross-section associated with the object 10 prior to the ejection of the latter.

When the ejection of the object 10 is controlled, the cooperation of the guide mast 14 with the bore 16 makes it possible to check the direction D in which the object 10 is ejected. By equipping the bore 16 with a helical groove in which is received a pin integrally formed with the mast 14, a rotary movement of the latter about an axis coinciding with the ejection direction D is also produced. The spin of the object 10 about said axis can also be produced by a separate component such as an electric motor, a spring, a gas jack, etc.

In existing constructions illustrated in FIG. 1, the guide mast 14 is cylindrical and has a circular cross-section, which has a uniform diameter over its entire length. In order to control the ejection direction D, the length of the mast 14 must be considerable, whereas its diameter must remain relatively small to limit the overall dimensions. The actuation of the spacing control device produces shocks and deformations, which can therefore lead to bending motions of the guide mast 14 symbolized by the arrow F in FIG. 1.

If a bending motion of the guide mast 14 occurs when the guidance length becomes increasingly small, the object 10 is no longer guided before the time of separation between the mast 14 and the bore 16. A transverse rotation velocity of the object 10 about its center of gravity G, symbolized by the arrow V is consequently produced. This transverse velocity component V associated with the spin motion of the object 10 about the axis of the bore 16 creates a compound Poinsot motion, whose amplitude can be relatively high. Consequently the control of the attitude of the object 10 after its launch is not controlled in a satisfactory manner, despite the spin communicated to the object.

Obviously, the disadvantage referred to hereinbefore for an object performing a spin motion after its launch is much greater in the case of the launch of an object without spin. The present invention solves the aforesaid drawbacks of the prior art by minimizing the value of the transverse rotation velocity communicated to the object during its ejection, e.g., the Poinsot motion amplitude in the case where the object has a spin motion, to provide a precisely controlled attitude of the ejected object.

SUMMARY OF THE INVENTION

Accordingly, the present invention provides a device for controlling the spacing of two members normally maintained in contact with one another, said device comprising ejection means located between said members which supplies a force tending to move them apart, said members are normally in contact by means of at least two pairs of complementary cylindrical surfaces, having generatrixes parallel to said force and arranged in such a way as to simultaneously lose contact during the operation of the ejection means.

Due to the fact that the two members are in simultaneous contact by at least two pairs of complementary cylindrical surfaces oriented parallel to the ejection force and said surfaces lose contact simultaneously during ejection, the vibrations and shocks which occur during the ejection cannot produce a transverse rotation velocity comparable to the velocity V in FIG. 1. Only a translation movement in the transverse bending direction F of the mast is transmitted to the object. Thus, there is precise control of the attitude of the ejected object as compared with existing technologies.

In a preferred embodiment of the invention, the complementary cylindrical surfaces have circular bases with different diameters.

Thus, each pair of complementary cylindrical surfaces advantageously has a first surface formed on a male element connected to a first of the members and a second surface formed on a female element connected to the second member.

In a first embodiment of the invention, the male element forms a guide mast rigidly fixed to the first member and the female element forms a guide tube rigidly fixed to the second member. In this case, the device advantageously has two pairs of stepped complementary cylindrical surfaces, the first surface of one of the pairs being formed on a first cylindrical portion of relatively small diameter of the guide mast and extending between splines of an intermediate splined portion of the guide mast, whereas the second surface of the other pair is formed on a second cylindrical portion of relatively large diameter of the guide mast and is extended over said splines.

In this embodiment of the invention, the guide mast can cooperate with the guide tube by helical guidance means to produce a spin motion of one of the objects with respect to the other.

In another embodiment of the invention, the ejection means comprise an ejector piston slideably mounted in the first member. The male element then forms a centering mast rigidly fixed to said ejector piston and the female element forms a centering tube rigidly fixed to the second member.

The spacing control device can be separate from the unlockable connecting means by which the two members are normally connected to one another or, conversely, can be formed integrally with said unlockable connection means. In the latter case, the mast is advantageously tubular and traversed by unlockable connecting means keeping the members in contact with one another.

When the ejection means comprise an ejector piston interposed between the two members, decelerating means are preferably provided so as to decelerate the ejector piston just before the complementary cylindrical surfaces simultaneously separate. This feature controls of the attitude of the ejected object by softly releasing said object.

The ejection means can also comprise a compression spring means placed between the ejector piston and the first member. The compression spring means preferably bears on the first member via a roll abutment means, which also serves to soften the release of the second member.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF PREFERRED EMBODIMENTS

Figure 1:
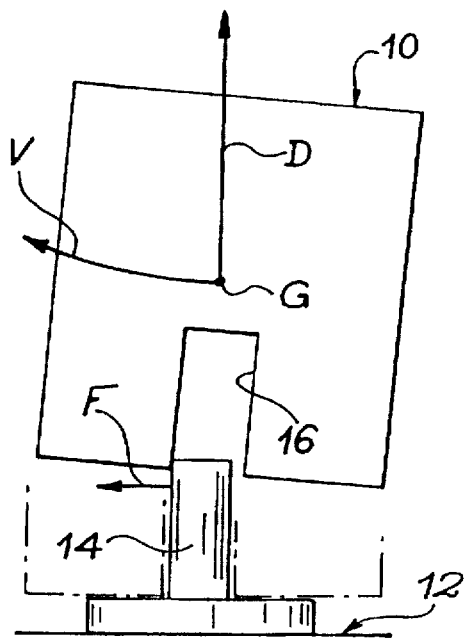
FIG. 1 depicts an object ejected from a spacecraft according to the prior art, at the time when it loses contact with said spacecraft.

The embodiment of the invention illustrated in FIG. 2 uses a certain number of the conventional spacing control means described with reference to FIG. 1. Thus, the first member constituted by the spacecraft 12 supports a guide mast 14 normally received in a bore 16 connected to the second member formed by the object 10, prior to the ejection of said member.

However, instead of having a uniform cross-section over its entire length, the mast 14 has a shoulder 18, which divides up its peripheral surface into a cylindrical surface 20 having a circular section and a relatively small diameter and a cylindrical surface 22 having a circular section and a relatively large diameter compared with the surface 20. More specifically, the cylindrical surfaces 20 and 22 are coaxial and stepped and the surface 20 surrounds the terminal portion of the mast 14, whereas the surface 22 surrounds the portion of the mast 14 contiguous to the spacecraft 12.

In a comparable manner, the bore 16 has a bottom cylindrical surface 26 of circular section and relatively small diameter and a cylindrical surface 28 of circular section and turned towards the exterior of the bore and having a relatively large diameter compared with the cylindrical surface 26.

The cylindrical surfaces 20 and 26, and 22 and 28 have the same diameters. Thus, they form two pairs of stepped complementary cylindrical surfaces, which slide in one another during the ejection of the object 10.

Figure 2:
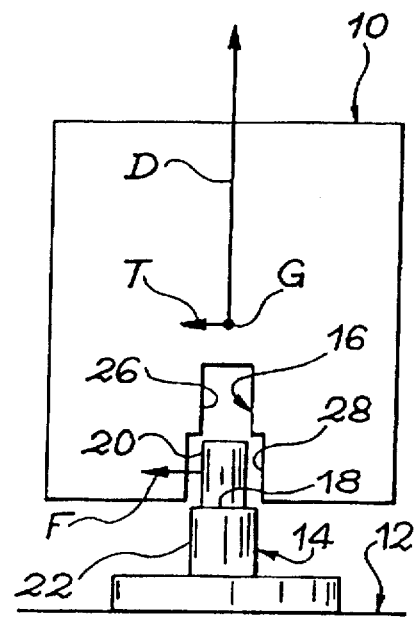
FIG. 2 depicts an object ejected from a spacecraft by a spacing control device according to a first embodiment of the invention.

Moreover, the relative arrangement between these different cylindrical surfaces is such that when the object 10 is ejected, the separation of the surfaces 20 and 26, and the surfaces 22 and 28 takes place simultaneously, as illustrated in FIG. 2. As a result of this simultaneous separation, a bending F of the mast 14 is transmitted to two different points of the object 10, which are spaced from one another in the ejection direction D of the object 10. Consequently, instead of producing a transverse rotation motion of the object 10 about its center of gravity G, the bending of the mast 14 leads to a simple transverse translation motion illustrated by the arrow T in FIG. 2. Immediately, a large radial clearance is formed ensuring the absence of any contact between the mast 14 subject to oscillations and the ejected object 10. This avoids any momentum transmission, remote from the center of gravity of the object and which would produce a very high transverse rotation.

The attitude of the object 10 ejected with the spacing control device of the present invention is consequently precisely controlled. For example, the transverse rotation velocity induced by a conventional device, like that illustrated in FIG. 1, is close to 30°/s. In contrast, the velocity is limited to approximately 1°/s by using the device of the present invention.

A spacing control device according to the present invention and operating according to the principle described hereinbefore with reference to FIG. 2 will now be described with reference to FIG. 3.

Figure 3:
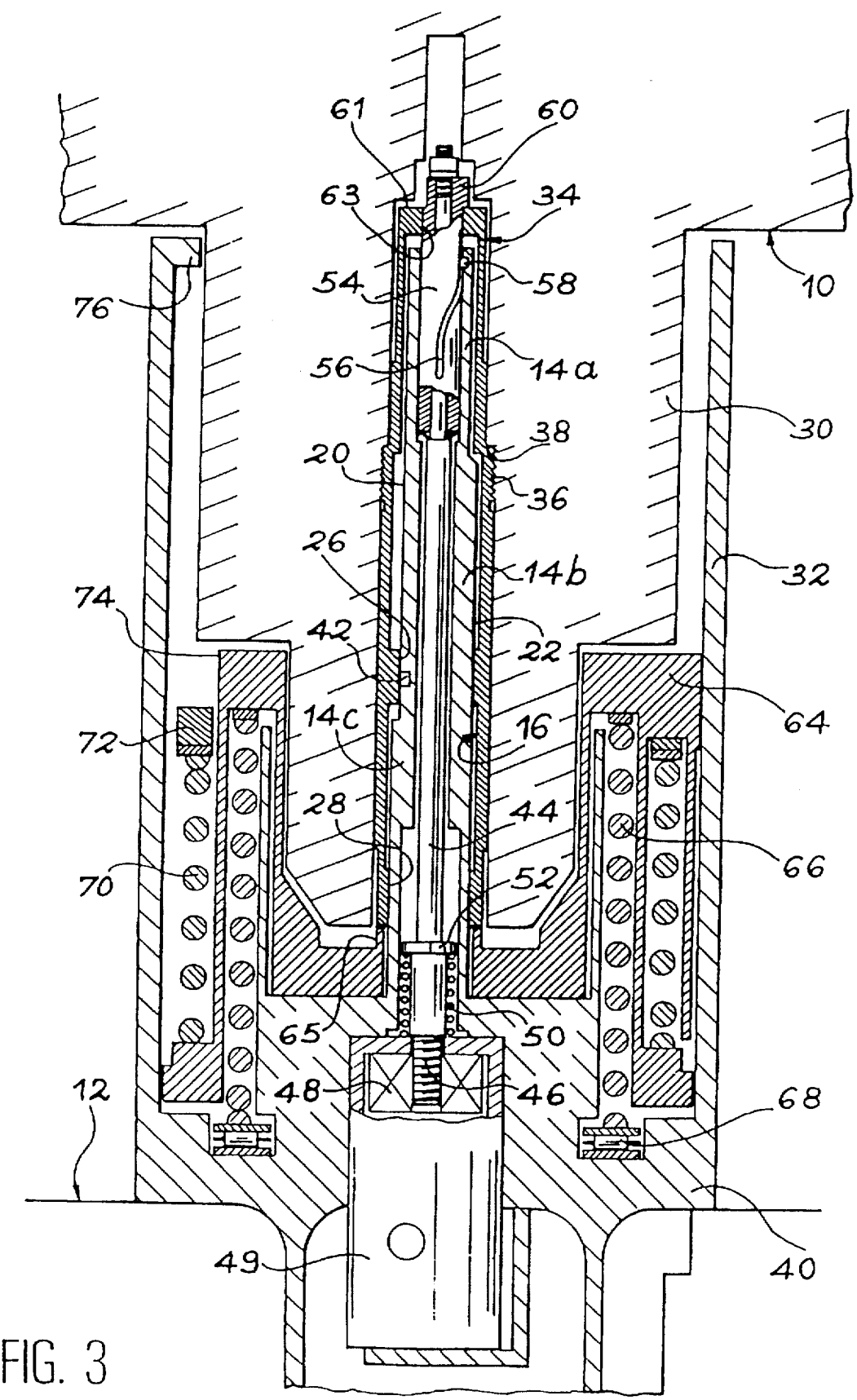
FIG. 3 is a longitudinal sectional view of a spacing control device according to the embodiment of FIG. 2.

In FIG. 3, the object 10 has a tubular, projecting portion 30, which penetrates a tubular box or casing 32, which is integral with the spacecraft 12, and the object 10 is connected to the latter by unlockable connecting means, like those to be described hereinafter.

The projecting portion 30 of the object 10 is screwed onto a stepped guide tube 34, whose inner surface has the stepped bore 16 described hereinbefore with reference to FIG. 2. This arrangement rigidly fixes the object 10 to the guide tube 34 carrying said stepped bore 16.

More specifically, the guide tube 34 is fixed to the projecting portion 30 by screwing a thread 36 formed on the guide tube 34 into a complementary tap formed in the projecting portion 13, until a shouldered portion of the guide tube 34 abuts against a shoulder 34 provided in the projecting portion 30.

The tubular box 32 is rigidly fixed to the spacecraft 12 by a support means 40 positioned facing the end of the projecting portion 30. In its central portion, the support means 40 carries the guide mast 14 received in the stepped bore 16.

The guide mast 14 is coaxial to the tubular box 32 and oriented perpendicular to the support 40.

As has been stated hereinbefore with reference to FIG. 2, the guide mast 14 cooperates with the guide tube 34 by two pairs of stepped complementary cylindrical surfaces having circular bases and different diameters. These complementary cylindrical surfaces control the guidance of the object 10 during its ejection parallel to the ejection direction D (FIG. 2), i.e. in the direction of the force exerted on the object during its ejection. Consequently, the generatrixes of these cylindrical surfaces are parallel to direction D and the force, which coincide with the axis common to the guide mast 14 and to the tubular box 32.

The two pairs of complementary cylindrical surfaces formed on the guide mast 14 and in the stepped bore 16 (described hereinbefore with reference to FIG. 2), lose contact simultaneously when the object 10 is ejected. A sufficiently large radial clearance then appears instantaneously between the mast 14 and the stepped bore 16, so that any subsequent interference risk between these two parts, liable to produce a transverse rotation velocity of the object 10, is prevented.

In the embodiment illustrated in FIG. 3, the complementary cylindrical surfaces of the first pair and the second pair overlap over a certain length of the guide mast 14 and the stepped bore 16. This overlap effectively controls the guidance of the object 10 during its ejection, without the need for the two pairs of guidance surfaces which can excessively increase the overall dimensions of the device in the direction of the axis of the mast 14.

Specifically, this overlap is obtained by producing the guide mast 14 in three successive portions. Thus, starting from its end, the mast 14 has a first cylindrical portion 14a of relatively small diameter, then an intermediate, splined portion 14b and finally a second cylindrical portion 14c with a relatively large diameter. The diameter of the first cylindrical portion 14a is smaller than the diameter of the second cylindrical portion 14c of the guide mast 14. Moreover, the diameter of the intermediate splined portion 14b of the mast is equal to the diameter of the first cylindrical portion 14a between the splines and equal to the diameter of the second cylindrical portion 14c on the splines.

As a result of this arrangement, the cylindrical surface 20 of the guide mast 14 is formed on the first cylindrical portion 14a of the mast and is extended between the grooves of the splined intermediate portion 14b, whereas the cylindrical surface 22 of the guide mast 14 is formed on the second cylindrical portion 14c of the mast and is extended on the splines of the channeled intermediate portion 14b.

To prevent a jamming risk during the ejection of the object 10, the cylindrical surfaces 26, 28 of the bore 16, which are in contact with the cylindrical surfaces 20, 22 respectively, are surfaces having a small length. More specifically, the cylindrical surface 26 normally in contact with the cylindrical surface 20 has the same number of longitudinal slots (not shown) as the intermediate portion 14b of the guide mast 14 has splines. For example, if the intermediate splined portion 14b has three splines, the latter are received in three longitudinal slots formed in the cylindrical surface 26.

To produce a spin of the object 10 during its ejection, the width of the splines formed in the cylindrical surface 26 significantly exceeds the width of the splines of the intermediate splined portion 14b, in order to authorize a rotation of the guide tube 34 with respect to the guide mast 14 during ejection. In this case, the spin motion can be produced by machining on the cylindrical surface 20 of the guide mast 14 a helical slot 42 forming a helical guidance means and in which is received a pin (not shown) projecting radially towards the interior from the cylindrical surface 26. Moreover, the cylindrical surface 28 is formed at the open end of the stepped bore 16, so as to be able to slide over the entire length of the cylindrical surface 22 during ejection.

In order that the two pairs of complementary cylindrical surfaces lose contact simultaneously during ejection, as has been described hereinbefore with reference to FIG. 2, the distance existing prior to ejection between the end of the cylindrical surface 26 turned towards the open end of the bore 16 and the end of the cylindrical surface 20 turned towards the end of the guide mast 14 is equal to the distance which then separates the end of the cylindrical surface 28 turned towards the end of the bore 16 from the end of the cylindrical surface 22 turned towards the end of the guide mast 14.

The object 10 is normally maintained in the position illustrated in FIG. 3, i.e. rigidly connected to the spacecraft 12, by unlockable connecting means which can be independent of the spacing control device or integrated into the latter. In the embodiment illustrated in FIG. 3, the unlockable connecting means are integrated into the spacing control device and will therefore be described briefly, although they do not form part of the invention.

The unlockable connecting means by which the object 10 is normally clamped to the spacecraft 12 can comprise a connecting rod 44 which traverses the entire length of the guide mast 14. To this end, the latter has a tubular configuration.

At its end turned towards the spacecraft 12, the connecting rod 44 has a threaded portion 46 normally held in a segmented nut 48, which bears in a box 49 fixed to the support 40. A weakly calibrated spring 50, located in the tubular guide mast 14 is interposed between the box 49 and a collar 52 formed on the connecting rod 44.

At its opposite end, the connecting rod 44 supports a sleeve 54. Sleeve 54 can rotate on the connecting rod 44, while being immobilized in the translation direction with respect to the latter. On its outer surface, the sleeve 54 has a helical slot 56 which receives a pin 58 which projects radially towards the interior from the guide mast 14. This arrangement transforms the translation of the connecting rod 44 relative to the guide mast 14 into a rotation of the sleeve 54.

At its end turned towards the object 10, the sleeve 54 projects through a window 63 formed in the corresponding end of the guide tube 34 and has one or more branches 60 radially oriented towards the outside. These branches 60 bear on the end face 61 of the guide tube 34, when the sleeve 54 occupies its angular position corresponding to the retracted locking position of the connecting rod 44 in the guide mast 14 illustrated in FIG. 3.

Conversely, a rotation of the sleeve 54 brought about by a displacement of the connecting rod 44 towards the end of the guide mast 14, i.e., towards a projecting unlocking position of said rod 44, brings the radial branches 60 in front of the window 63 formed in the end of the guide tube 34. This window 63 has a complementary shape to that of the end of the sleeve 54 carrying the branches 60, in such a way that said end can then freely traverse the end of the guide tube 34. This position corresponds to the unlocking of the connecting means, i.e. it makes it possible to separate the object 10 from the spacecraft 12 by a sliding of the guide tube 34 on the guide mast 14.

The passage of the connecting rod 44 from its retracted locking position into its projecting unlocking position is controlled by the spring 50, when the threaded end 46 of the connecting rod is released from the segmented nut 48. The segmented nut 48 is normally kept in engagement on the threaded end 46 of the connecting rod 44 by a mechanism (not shown) housed in the box 49. The release of this mechanism can be controlled by an initiating system (not shown) installed in the box 49 and which can be, e.g., a pyrotechnic means.

The spacing control device according to the invention also has ejection means to control the ejection of the object 10 with respect to the spacecraft 12, when the connecting means normally connecting these two members are unlocked. The ejection means are housed between the support 40 and the end of the projecting portion 30 of the object 10 within the tubular box 32.

In the embodiment illustrated in FIG. 3, the ejection means comprises an ejector piston 64 sliding in the tubular box 32, so that it normally bears against the end face of the guide tube 34 rigidly fixed to the object 10 when the connecting means are locked. This ejector piston 64 is an annular piston arranged coaxially around the guide mast 14 without having any contact with the latter and has a central skirt 65 normally trapped between the support 40 and the adjacent end of the guide tube 34.

The ejection means also incorporate a helical compression spring 66, whereof one end bears on the support 40 by a roll abutment means 68 and the other end bears on one face of the ejector piston 64 turned towards said support 40. In the preferred embodiment illustrated in FIG. 3, decelerating means are associated with the ejector piston 64, so that the velocity of the latter is decelerated just before the complementary cylindrical surfaces of the guide mast 14 and the stepped bore 16 simultaneously lose contact during the ejection of the object 10. This avoids a hard, travel termination shock between the piston 64 and the arm 76, when the object 10 is still in contact with the mast 14. This shock is avoided when the radial clearance is obtained between the mast 14 and the object 10 (described hereinafter). The control of the ejection force obtained by the decelerating means contributes to the control of the attitude of the object 10 after its ejection.

In FIG. 3, the decelerating means comprises a helical compression spring 70 with a limited displacement which is placed around the ejector piston 64 and whose ends normally bear against two facing shoulders formed on said piston. More specifically, the end of the compression spring 70 closest to the object 10 bears on one of the said shoulders by a ring means 72. One or more notches 74 are formed in a portion of the ejector piston 64 which is closest to the object 10 in front of the ring 72. Respectively, the tubular box 32 has the same number of arms 76 as the ejector piston 64 has notches 74. The arms 76 are placed in front of the notches 74 and bear against the ring 72 during the ejection of the object 10.

In order that the helical compression spring 70 can dampen the complementary cylindrical surfaces of the guide mast 14 and the bore 16 before these surfaces lose contact, the distance separating the ring 72 from the arms 76 when the object 10 is connected to the spacecraft by the unlockable connecting means is slightly less than the travel distance of the cylindrical surfaces 26 and 28 on the cylindrical surfaces 20 and 22 respectively.

In the first embodiment of the invention described hereinbefore with reference to FIGS. 2 and 3, the ejection direction D of the object 10 is determined by the cooperation of the stepped bore 16 with the guide mast 14. In a second embodiment of the invention which will now be described with reference to FIGS. 4A, 4B and 5, the ejection direction is communicated to the object 10 by the ejector piston 64.

Figure 4A:
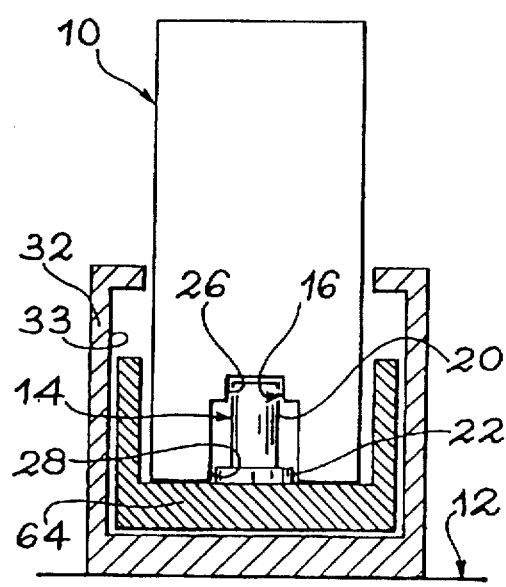
FIGS. 4A and 4B depict the initial position and the contact loss position, respectively, of an ejected object by a spacing control device according to a second embodiment of the invention.
Figure 4B:
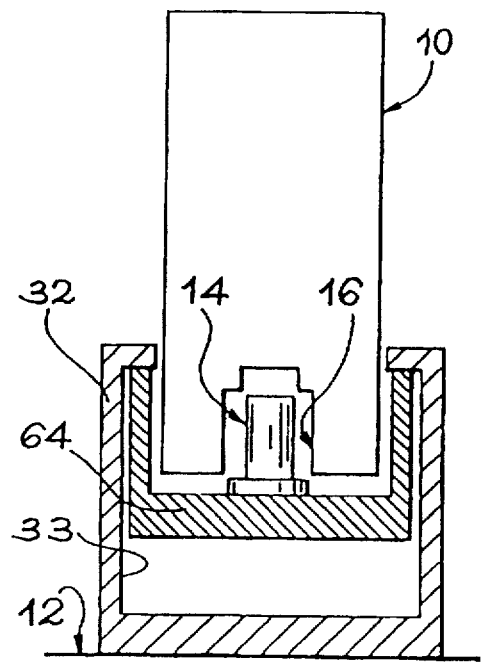

As illustrated by FIGS. 4A and 4B, the ejector piston 64 cooperates with a guidance surface 33 formed in the tubular box or casing 32. Instead of being rigidly fixed to the spacecraft 12, the mast 14 is, in this embodiment, integral with the ejector piston 64 and essentially serves to center the object 10 with respect to the ejector piston 64 (FIG. 4A). Consequently, there is no relative displacement between the piston 64 and the object 10 until the ejector piston terminates its travel, as illustrated in FIG. 4B. The centering cooperation between the object 10 and the mast 14 is brought about by means of two pairs of complementary cylindrical surfaces, which simultaneously lose contact when the object is ejected. These cylindrical surfaces are, once again, designated by the references 20, 22 for the mast 14 and 26, 28 for the bore 16. As in the first embodiment, the cylindrical surfaces control the attitude of the ejected object, avoiding vibrations and shocks produced during the ejection transmitting a transverse rotation velocity to the object 10.

Figure 5:
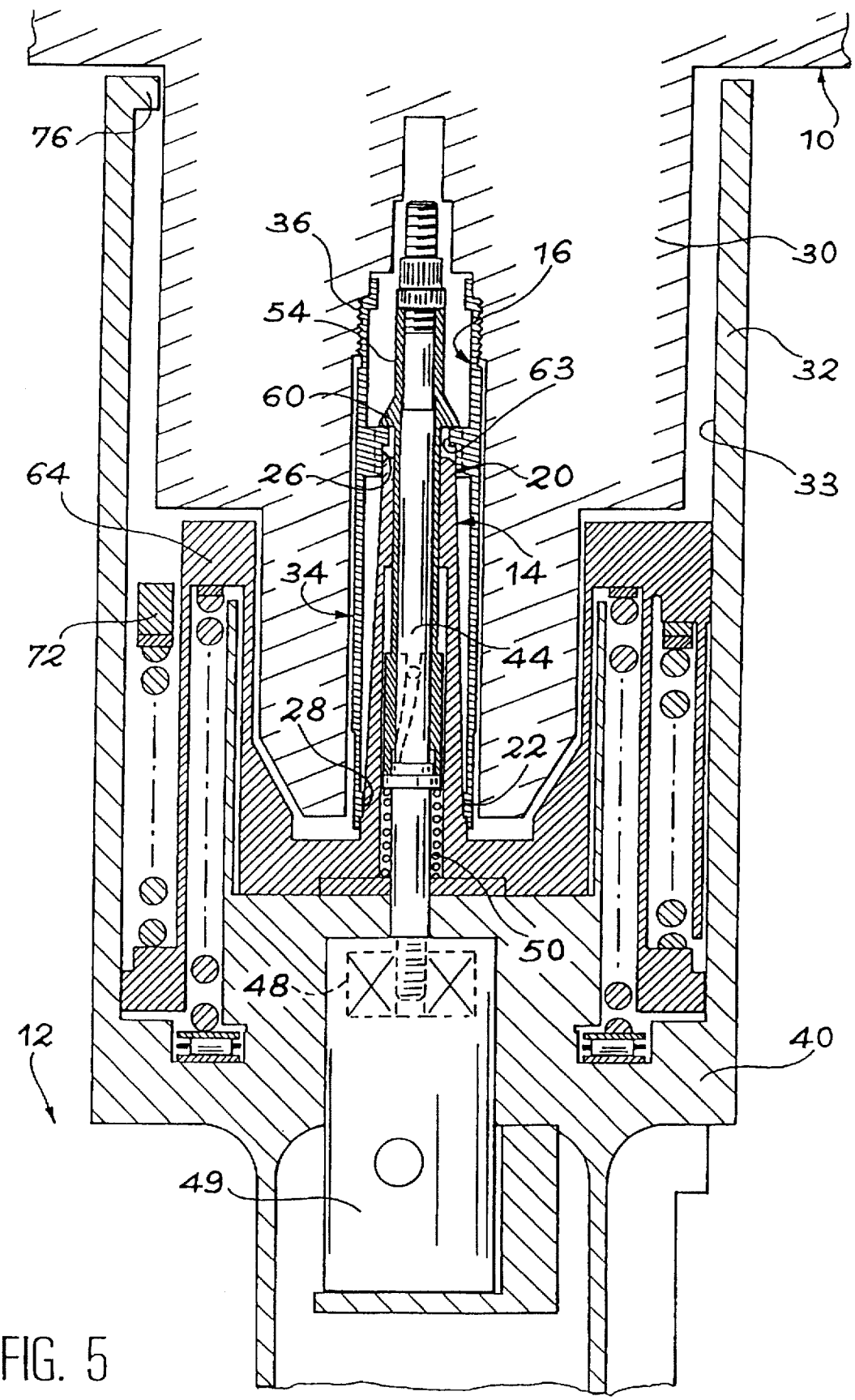
FIG. 5 is a longitudinal sectional view of the spacing control device of the embodiment of FIGS. 4A and 4B.

FIG. 5 illustrates a variant of the second embodiment described with reference to FIGS. 4A and 4B. As this variant has numerous features identical to the first embodiment described hereinbefore, only the significantly different parts will be described.

The ejector piston 64 is slideably mounted in the guidance surface 33 of the tubular box 32, so as to transmit an ejection force to the object 10 in a predetermined direction. In its central portion, the ejector piston 64 carries the mast 14, which, in this case, comprises a centering mast on which is normally fitted the centering tube 34 screwed into the projecting portion 30 of the object 10.

In this embodiment, the cylindrical surfaces (having a circular base and different diameters) have a cylindrical bearing surface 20 with a relatively small diameter provided at the end of the mast 14 and a relatively large diameter, cylindrical bearing surface 22 provided at the base of the mast 14. Each of the bearing surfaces 20 and 22 is normally fitted over an identical length into the cylindrical bearing surfaces 26, 28, respectively, provided in the bottom and at the end of the bore 16 made in the tube 34.

The unlockable connecting means are comparable to those described hereinbefore with reference to FIG. 3. The integration of the spacing control devices described with reference to FIGS. 3 and 5, as well as their operation, are comparable. To integrate the device, the tube 34 is mounted on the mast 14 and locked on the latter by the sleeve 54 (because the connecting rod 44 is maintained in the retracted position by the segmented nut 48). In the embodiment of FIG. 3, the end of the tube 34 closest to the support 40 bears against the skirt 65 of the ejector piston 64, thereby compressing the helical compression spring 66.

The projecting portion 30 of the object 10 is then introduced into the tubular box 32 and the spacing control device is screwed by its thread 36 into said projecting portion 30. Finally, the support 40 is rigidly fixed to the spacecraft 12.

When the ejection of the object 10 is initiated, the initiator system located in the box 49 is actuated and separates the different segments of the nut 48. The connecting rod 44 is then separated from the support 40 moves away from the latter under the action of the compression spring 50. A relative translation movement then occurs between the connecting rod 44 and the mast 14. This leads to a rotation of the sleeve 54, which progressively brings the branches 60 in front of the complementary window 63 formed in the tube 34. The spacing control device can then come into action.

In the first embodiment of the invention illustrated in FIGS. 2 and 3, the ejector piston 64 pushes the projecting portion 30 of the object 10 in the ejection direction defined by the axis of the guide mast 14, by making the guide tube 34 slide along said mast. Towards the end of this sliding action, the ring 72 abuts against the arms 76, so that the damping effect of the helical compression spring 70 occurs, just prior to the simultaneous loss of contact between the two pairs of cylindrical surfaces of the stepped bore 16 and the guide mast 14.

Thus, the object 10 is ejected from the spacecraft 12 in the ejection direction defined by the mast 14, without any significant transverse rotation velocity being communicated to the object. If appropriate, a spin motion tending to rotate the object 10 about the axis of the stepped bore 16 is communicated to the object.

In the embodiment illustrated in FIGS. 4A, 4B and 5, the projecting portion 30 of the object 10, as well as the tube 34 and the mast 14 travel with the ejector piston 64 as the connecting means are unlocked. Thus, at this moment there is a relative displacement between the tube 34 and the mast 14.

When the ring 72 abuts against the arms 76, the ejector piston 64 is decelerated. However, the object 10 maintains its ejection velocity. The cylindrical surfaces 26 and 28 then simultaneously escape from the cylindrical surfaces 20, 22 formed on the mast 14 before the spring 70 imparts a travel shock to the object 10. The ejector piston 64 is then stopped and the object 10 alone continues its travel in the ejection direction given to it by the device. Consequently, the ejection of the object 10 takes place as previously without imparting a transverse rotation velocity to said object.

As has been stated hereinbefore, the unlockable connecting means do not form part of the invention and can be implemented in a manner known to those skilled in the art, e.g., either within the control device, or independently thereof.

Accordingly, the present invention is intended to cover all such alternatives, modifications, and equivalents as may be included within the spirit and broad scope of the invention as defined only by the hereafter appended claims.

We claim:

1. A device for controlling the spacing of two members normally maintained in contact with one another, said device comprising:

an ejection means, adapted to applying a spacing force between said members;

a male element connected to a first of said members and having a first pair of stepped cylindrical surfaces; and a female element connected to a second of said members and having a second pair of stepped cylindrical surfaces;

wherein said first and second pairs of cylindrical surfaces are complementary surfaces having generatrixes parallel to said spacing force, each of the cylindrical surfaces of the first pair being fitted over an identical length into the cylindrical surfaces of the second pair when the ejection means is not actuated, whereas the cylindrical surfaces of the first and second pairs simultaneously lose contact upon actuation of the ejection means.

2. A device according to claim 1, wherein the cylindrical surfaces of the first pair have different diameters and the cylindrical surfaces of the second pair have different diameters, identical to the diameters of the cylindrical surfaces of the first pair.

3. A device according to claim 1, wherein the male element is a guide mast rigidly fixed to the first member and the female element is a guide tube rigidly fixed to the second member.

4. A device according to claim 3, wherein the guide mast comprises a first cylindrical portion having a relatively small diameter, a second cylindrical portion having a relatively large diameter, and a splined portion forming splines intermediate between said first and second cylindrical portions, a first of the cylindrical surfaces of the first pair being formed on said first cylindrical portion and extending on the splined portion between the splines, and the second cylindrical surface of the first pair being formed on the second cylindrical portion and extending over the splines of the splined portion.

5. A device according to claim 3, and further comprising a helical guidance means disposed between the guide mast and the guide tube.

6. A device according to claim 1, wherein the ejection means comprises an ejector piston slidingly mounted on the first member, the male element being a centering mast rigidly fixed to said ejector piston, and the female element being a centering tube rigidly fixed to said second member.

7. A device according to claim 6, wherein the ejection means further comprises a decelerating means arranged so as to decelerate the ejector piston just before the first and second pairs of cylindrical surfaces lose contact.

8. A device according to claim 7, wherein the ejection means further comprises a compression spring means interposed between the ejector piston and the first member and bearing on said first member via a roll abutment.

9. A device according to claim 1, wherein the male element is tubular, and an unlockable connecting means is received within said male element for maintaining said members in contact with one another.

10. A device according to claim 1, wherein the first and second members are a spacecraft and an object to be ejected from said spacecraft, respectively.

11. A device for controlling the spacing of two members normally maintained in contact with one another, said device comprising: an ejection means adapted to apply a spacing force between said members; said members each having at least two pairs of complementary cylindrical surfaces with generatrixes parallel to said force and arranged to simultaneously lose contact when the ejection means is actuated; said complementary cylindrical surfaces having circular bases with different diameters between the individual pairs; each pair of complementary cylindrical surfaces consisting of a first pair formed on a male element connected to a first of said members and a second surface formed on a female element connected to the second member;

the male element forming a guide mast fixed rigidly to the first member and the female element a guide tube rigidly fixed to the second member; and wherein the first surface of one of the complimentary pairs is formed on a first cylindrical portion with a relatively small diameter of the guide mast and is extended between the splines of a splined intermediate portion of the guide mast, and the first surface of the other pair is formed on a second cylindrical portion with a relatively large diameter of the guide mast and is continued over said splines, and the guide mast cooperates with the guide tube by helical guidance means.

12. A device according to claim 1, wherein the ejection means comprise an ejector piston slidably mounted on the first member, the male element forming a centering mast rigidly fixed to said ejector piston and the female element forming a centering tube rigidly fixed to said second member.

13. A device for controlling the spacing of two members normally maintained in contact with one another, said device comprising: an ejection means adapted to apply a spacing force between said members; said members each having at least two pairs of complementary cylindrical surfaces with generatrixes parallel to said force and arranged to simultaneously lose contact when the ejection means is actuated; complementary cylindrical surfaces have circular bases with different diameters between the individual pairs; said each pair of complementary cylindrical surfaces consisting of a first pair formed on a male element connected to a first of said members and a second surface formed on a female element connected to the second member; the male element forming a guide mast fixed rigidly to the first member and the female element a guide tube rigidly fixed to the second member; wherein the first surface of one of the complimentary pairs is formed on a first cylindrical portion with a relatively small diameter of the guide mast and is extended between the splines of a splined intermediate portion of the guide mast, the first surface of the other pair is formed on a second cylindrical portion with a relatively large diameter of the guide mast and is continued over said splines, and the guide mast cooperates with the guide tube by helical guidance means; and wherein the ejection means comprises an ejector piston interposed between the two members and decelerating means to decelerate the ejector piston just before the complementary cylindrical surfaces simultaneously lose contact.

14. A device according to claim 13, wherein the ejection means also comprises a compression spring means interposed between the ejector piston and the first member, said spring means bearing on said first member via a roll abutment means.

* * * * *